United States Patent [19]

Segan

[11] Patent Number: 4,652,980

[45] Date of Patent: Mar. 24, 1987

[54] MUSIC AND LIGHTS CHRISTMAS BALL ORNAMENT

[76] Inventor: Marc H. Segan, 154 W. 70th St., Apartment 7A, New York, N.Y. 10023

[21] Appl. No.: 788,362

[22] Filed: Oct. 17, 1985

[51] Int. Cl.[4] ............................................. H04M 1/22

[52] U.S. Cl. ..................................... 362/86; 362/806; 362/157; 84/94 C

[58] Field of Search .......................... 362/86, 806, 157; 428/3, 11; 84/94 C, 95 C

[56] References Cited

U.S. PATENT DOCUMENTS

| | | | |
|---|---|---|---|
| 2,726,320 | 12/1955 | Damiano | 428/11 |
| 3,873,880 | 3/1975 | Riddell | 428/11 |
| 4,452,836 | 6/1984 | Daniels, Jr. | 362/806 |
| 4,491,492 | 1/1985 | Davis, Jr. et al. | 428/11 |
| 4,542,676 | 9/1985 | Carlson et al. | 84/54 C |

FOREIGN PATENT DOCUMENTS

| | | | |
|---|---|---|---|
| 370946 | 9/1963 | Switzerland | 84/94 C |

*Primary Examiner*—E. Rollins Cross
*Attorney, Agent, or Firm*—Pennie & Edmonds

[57] ABSTRACT

A self-powered, illuminated ornament, decorated with an acetate shrink wrap covering a substantial portion of its surface, in which the light and power source are so arranged within a hollow ornament that the entire decorated surface is illuminated when the light source is lit. In a preferred embodiment of the ornament, a means to produce music is also contained within the ornament.

14 Claims, 8 Drawing Figures

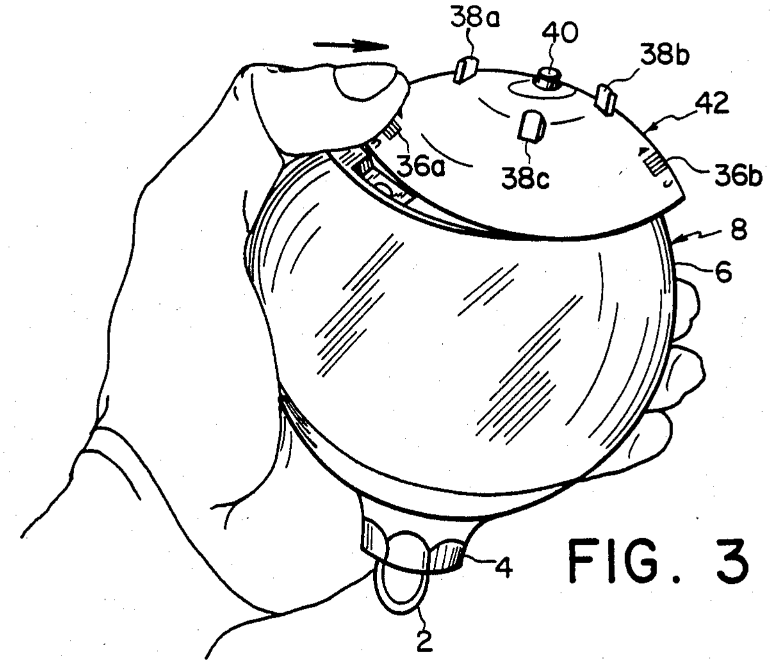
FIG. 3
FIG. 4
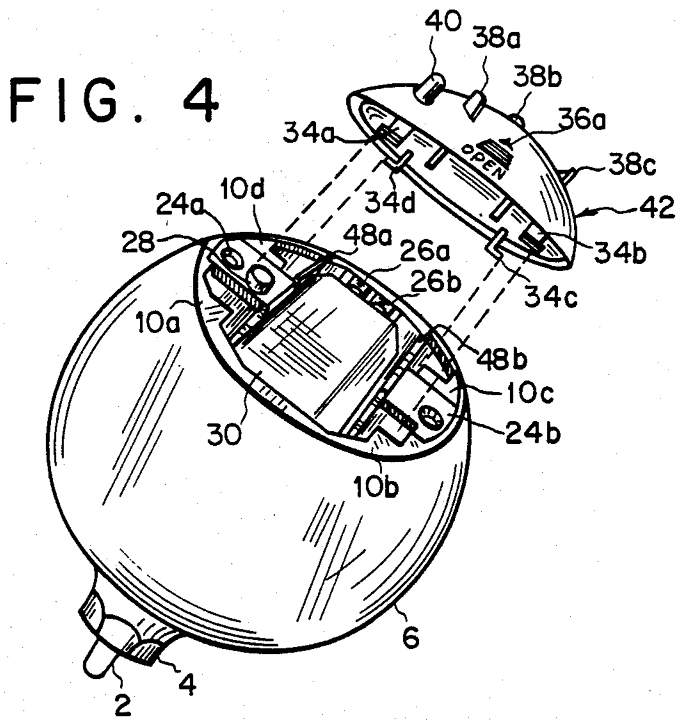

MUSIC AND LIGHTS CHRISTMAS BALL ORNAMENT

FIELD OF THE INVENTION

The present invention relates generally to the field of illuminated ornaments, and more specifically to illuminated Christmas ornaments which contain a music-producing mechanism and are decorated with acetate shrink wrap.

BACKGROUND OF THE INVENTION

There are many types of illuminated ornamental devices presently available to the public. Often, such devices operate using conventional household alternating current, thereby requiring unsightly wires and consuming large quantities of energy. Music boxes are also many and varied in the prior art. However, no prior art ornaments have combined music with self-powered illumination in such a manner that the entire decorated surface can be brightly illuminated.

One example of prior art ornaments is U.S. Pat. No. 2,726,320, which discloses an ornament containing an electric light bulb connected to an electric cord and powered by household alternating current.

Another example, U.S. Pat. No. 3,303,734, discloses a Christmas ornament with a music box inside, but without a light.

The ornament shown in U.S. Pat. No. 3,873,880 is self-powered, but the arrangement of the battery pack and neon lamps permits only partial illumination of the ornament when lit. Moreover, it would be impossible to decorate this ornament with acetate shrink wrap and still have access to the mechanism of the ornament to change the battery or the light bulbs.

In the well-know method of decorating objects with acetate shrink wrap, the desired design is printed directly on a flat, rectangular sheet of acetate shrink wrap (commonly made from extruded polyvinylchloride film), then the rectangular sheet of acetate is formed into a cylinder. Next, the cylinder is slipped over and positioned on the object to be decorated. Finally, heat is applied, "shrinking" the sheet so it forms a tight skin around the object. Due to the strength of the wrap, the ornament cannot be separated along any seam covered by the decorative acetate sheet.

SUMMARY OF THE INVENTION

The present invention describes a self-powered, illuminated ornament decorated with acetate shrink wrap over a substantial portion of its surface in which the light source is placed within a hollow, ornamented container in such a manner that when the light is lit, the entire decorated surface is illuminated. In a preferred embodiment of this invention, a means to produce music is also contained within the ornament.

The light source, the power source, the music-producing mechanism, and the circuitry connecting all of these elements are so arranged that all of the opaque components are clustered towards one end of the hollow ornament and stacked into a modified pyramid. This arrangement creates sufficient space around the opaque components that the light from the light source illuminates the entire decorated surface.

The hollow housing of the ornament is so constructed that it is separable into at least two parts. One part can be removed, allowing access to the power source, commonly a 9-volt battery. A particular feature of the preferred embodiments is the particular arrangement of the battery holder in a chordal section of the spherical ornament. The cover to the battery section slides off revealing only the battery holder, thus permitting the battery to be exchanged without exposing the delicate interior light and music components to damage. Unlike a hinged door arrangement, the sliding door arrangement has the additional advantage in that it can be molded in one piece, making this particular arrangement easier and more economical to manufacture. When necessary, the components forming the illuminating and musical portions of this ornament can be disassembled for repairs and changing the light source, commonly a light bulb.

The switch for regulating the light and musical elements of this ornament extends from the exterior of the ornament. The switch connects the electric circuitry and power source without any complete electrical conductors between the power source and the operator, thus the sliding door can be completely separated from the rest of the ornament.

The accompanying drawings show, by way of example, embodiments of the self-powered illuminated ornament forming the present invention.

BRIEF DESCRIPTION OF THE DRAWINGS

FIG. 3 shows a slightly perspective, bottom view of a partially disassembled ornament.

FIG. 4 is a partially exploded, perspective, bottom view of the ornament. Single dashed lines indicate how the parts are joined.

DETAILED DESCRIPTION OF THE INVENTION

Figure 1:
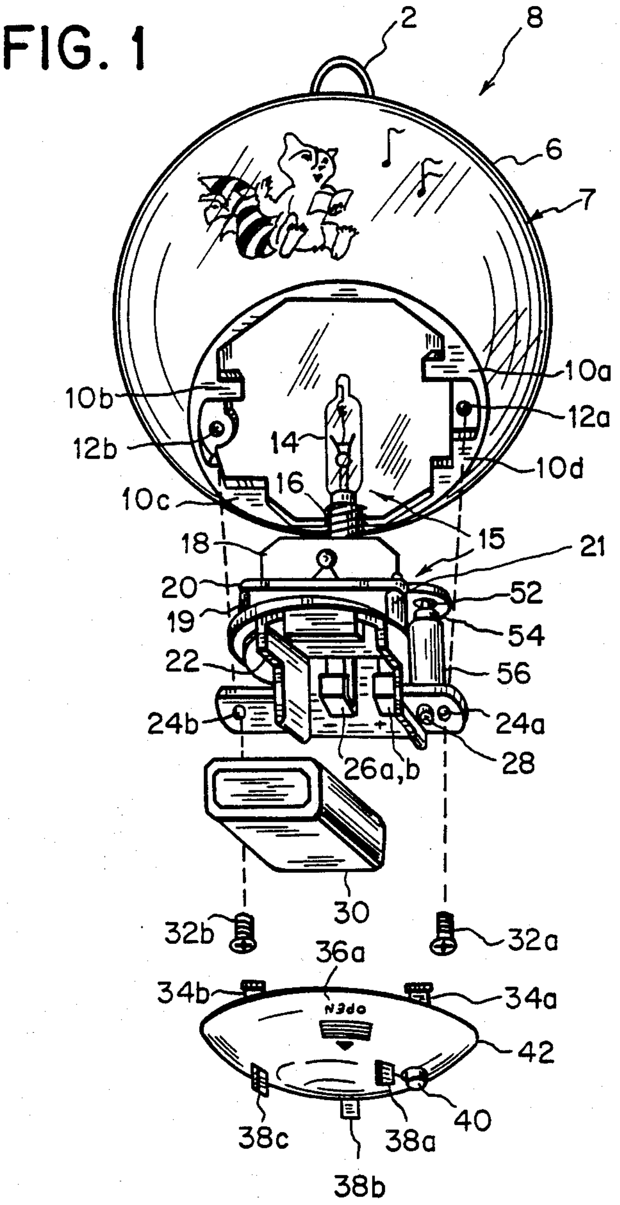
FIG. 1 is an exploded, perspective view of the ornament. Single dashed lines indicate how the parts are joined.

In the embodiment of the present invention as described in FIG. 1, the source of illumination, light bulb 14, is screwed into light bulb holder 16. Light bulb holder 16 is inserted into circuit board 20. Integrated circuit 18 is programmed to play any desired musical selection and is also inserted into circuit board 20. A suitable circuit for this purpose is described in detail in U.S. Pat. No. 4,250,787.

Circuit board 20 is attached by screws or other means to battery bracket 22. A space is maintained between circuit board 20 and battery bracket 22 by means of columns 21 and pins 19. Any number of columns or pins are suitable as long as they are sufficient to maintain the desired space between circuit board 20 and battery bracket 22. Speaker 58 is located in a recess at the top of battery bracket 22. Positive battery contact 26*a* and negative battery contact 26*b* are attached to circuit board 20 by conventional means. Positive battery bracket 26*a* and negative battery bracket 26*b* are bent in a manner to fit into the spaces provided within battery bracket 22. Battery bracket 22 is shaped so that a conventional 9-volt battery will fit into battery bracket 22 and make contact with negative and positive battery contacts, respectively 26*a* and 26*b*.

Stud guide 56 is attached to battery bracket 22. Stud 54 is threaded through stud guide 56. One end of stud 54 terminates in button switch 28. The other end of stud 54 is so constructed that it will contact and compress key disc 52 when button switch 28 is depressed. The compression of key disc 52 will complete the electrical circuit on the the circuit board permitting the operation and control of the musical and illuminating elements of this particular embodiment of the present invention.

When ornament 8 is completely assembled, the light emitted and the music played within ornament 8 can be regulated by sufficient pressure applied to spring lock switch 40, thereby depressing button switch 28. Spring lock switch 40 is inserted through battery door 42.

Musical and lighting apparatus 15, when completely assembled, can be placed entirely within cover 6 of ornament 8, illustratively a 3¼ inch spherical Christmas ball. Decorative acetate shrink wrap 7, which covers a substantial portion of cover 6, is not broken or disturbed by assembly and disassembly of musical and lighting apparatus 15.

Musical and lighting apparatus 15 is secured within cover 6 by fixing screws 32*a* and 32*b* or other conventional means. In this particular embodiment, fixing screws 32*a* and 32*b* are inserted through battery bracket screw appertures 24*a* and 24*b* and threaded into fixing screw holders 12*a* and 12*b*. Fixing screw holders 12*a* and 12*b* are part of cover 6 in this embodiment.

Battery door 42 is so constructed as to include locking legs 34*a–d*. Locking legs 34*a–d* wedge into locking shelves 10*a–d*, formed as part of cover 6. To assemble, battery door 42 is slid over cover 6, and locking legs 34*a–d* will then engage together with locking shelves 10*a–d*.

In the particular embodiment described in FIG. 1, battery door 42 also has standing legs 38*a–c* permitting ornament 8 to stand on a surface, when it is not hung on a Christmas tree or string by hook 2. Battery door 42 also has finger grips 36*a* and 36*b* providing for easy opening and closing of battery door 42.

Figure 2:
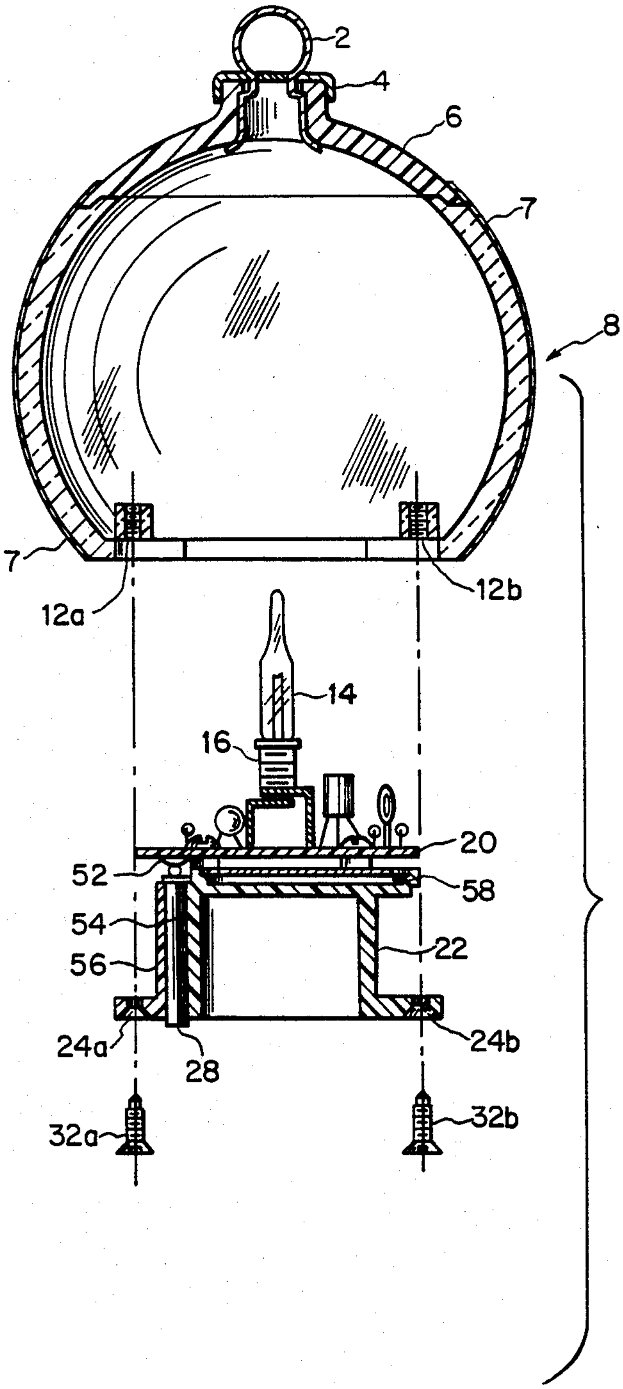
FIG. 2 is an exploded, diametric section of the upper portion of the ornament. Single dashed lines indicate how the parts are joined.

FIG. 2 is an exploded, diametric section of cover 6, and illustrates the details of battery bracket 22. In particular, FIG. 2 discloses the placement of speaker 58 within a recess in battery bracket 22, as well as the location of stud 54 within stud guide 56. Fixing screw holders 12*a* and 12*b* are also visible in this section. Cap 4, which was hidden from view in FIG. 1, is discernable in FIG. 2.

FIG. 2 also illustrates how decorative acetate shrink wrap 7 extends along the surface of cover 6.

FIG. 3 shows how battery door 42 can be slid off cover 6 in order to open ornament 8.

FIG. 4 shows ornament 8 once battery door 42 is lifted. Furthermore, FIG. 4 illustrates the positions of locking legs 34*a–d* and locking shelves 10*a–d*. It also demonstrates the ease with which battery 30 can be replaced when necessary.

Figure 5:
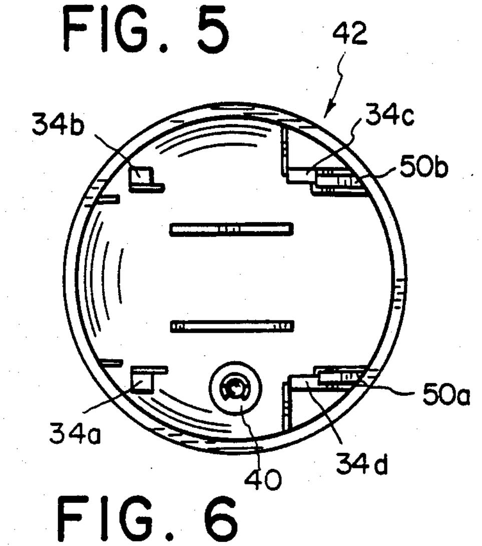
FIG. 5 is a top view of the lower part of the ornament, when it is separated from the upper part of the ornament.

The details of the interior of battery lid 42 are described in FIG. 5. Channels 50*a* and 50*b* fit together with channel guides 48*a* and 48*b* (illustrated in FIG. 4), when cover 6 and battery lid 42 are slid together in the completely assembled ornament 8.

Figure 6:
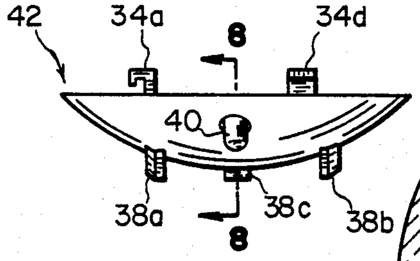
FIG. 6 is a side elevation of the lower part of the ornament, when it is separated from the upper part of the ornament.

Battery lid 42 is shown from the side in FIG. 6, demonstrating the configuration of locking leg 34*a*. FIG. 3 also shows finger grips 36*a* and 36*b* in opposition to each other and the full complement of standing legs 38*a–c*.

Figure 8:
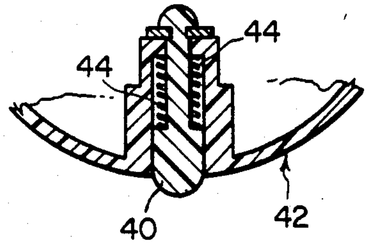
FIG. 8 shows a greatly enlarged, fragmentary cross section taken substantially along the line 8—8 of FIG. 6.

The greatly enlarged cross-section of spring lock switch 40, in FIG. 8, shows the placement of spring 44 in relation to spring lock switch 40.

Figure 7:
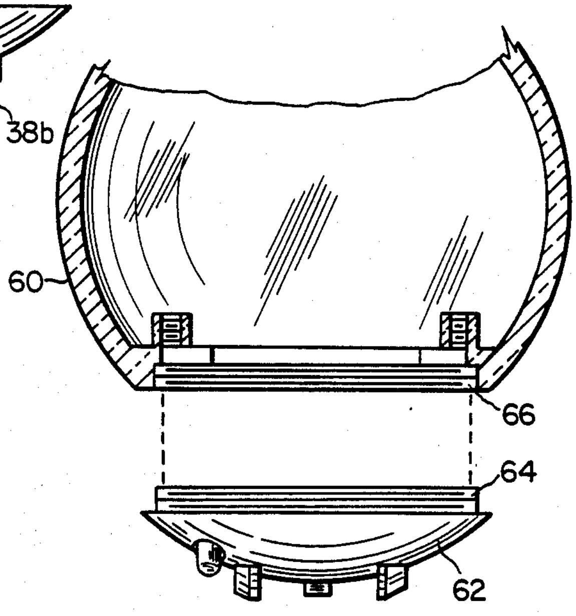
FIG. 7 is a greatly enlarged, fragmentary diametric section of an alternative embodiment of the ornament, partially exploded. Single dashed lines indicate how the parts are joined.

FIG. 7 is an embodiment of the present invention where cover 60 is attached to battery lid 62 by turning screw threads 64 into receiving threads 66.

It is expected that many variations can be made in the method of assembling the cover and the battery door of the ornament, the types of lights used, and so forth. In addition, the cover may be formed from a number of molded pieces, which are then assembled into one unit and covered with the decorative acetate shrink wrap. These and other variations can be made in the detailed construction, but it shall be understood that such changes are within the spirit and scope of the present invention as defined by the following claims.

What is claimed is:

1. A self-powered, illuminated ornamental device, comprising:

- a substantially hollow, light-transmitting housing, said housing being separable into a first shell and second shell, said first shell comprising 75% to 95% of the surface area of the ornament and said second shell comprising 5% to 25% of the surface area of the ornament;
- a decorative, light-transmitting medium encasing at least 70% of said first shell thereby limiting the separability of said first shell and second shell;
- at least one light source disposed within said housing;
- a power source disposed within said housing;
- an electric circuit controlling means disposed within said housing connecting said light source to said power source; and
- an arrangement of said light source, said power source and said electric circuit controlling means for assembly into said first shell through said separation, permitting the illumination of essentially the entirety of said light-transmitting medium and permitting replacement access to said power source by separation of said housing into said shells.

2. The ornamental device of claim 1, wherein said electric circuit controlling means includes a means to play at least one volume level of a musical selection.

3. The ornamental device of claim 1, wherein said electric circuit controlling means includes a means to cause the rhythmic flashing of said light source.

4. The ornamental device of claim 1, wherein said electric circuit controlling means includes a means to play at least one volume level of a musical selection and to cause the rhythmic flashing of said light source in synchrony with said playing of at least one volume level of said musical selection.

5. The ornamental device of claim 1, including

- a connecting means, having no electrical conductivity, disposed within said housing, for operating said electric circuit controlling means, and
- a mechanical means for engaging said connecting means, disposed through said housing, and for operating said electric circuit controlling means operation from without said housing.

6. The ornamental device of claim 5, wherein said electric circuit controlling means includes a means to play at least one volume level of a musical selection.

7. The ornamental device of claim 5, wherein said electric circuit controlling means includes a means to cause the rhythmic flashing of said light source.

8. The ornamental device of claim 5, wherein said electric circuit controlling means includes a means to play at least one volume level of a musical selection and to cause the rhythmic flashing of said light source in synchrony with said playing of at least one volume level of said musical selection.

9. A self-powered, illuminated ornamental device comprising:

a substantially hollow, light-transmitting housing,
said housing having a first shell and a second shell;
said first shell comprising 75% to 95% of the surface area of the ornament and having
at least one light source disposed within said first shell,
a power source disposed within said first shell,
an electric circuit controlling means disposed within said first shell connecting said light source to said power source,
a connecting means, having no electrical conductivity, disposed within said first shell, for operating said electric circuit controlling means, and
a locking means for assembling together said first shell with said second shell;
said second shell comprising 5% to 25% of the surface area of the ornament and having
a mechanical means, disposed through said second shell, for engaging said connecting means and operated from without said second shell, and
a locking means for assembling together said first shell with said second shell; and
a decorative, light-transmitting medium encasing at least 70% of said first shell thereby limiting the separability of said first shell;
said light source, said power source, said electric circuit controlling means, and said connecting means being assembled into said first shell through said separation and being arranged so that when said first shell is assembled together with said second shell and said mechanical means engages said connecting means, essentially the entirety of said light-transmitting medium is illuminated and replacement access to said power source is permitted.

10. The ornamental device of claim 9, wherein said locking means of said first shell slides together with said locking means of said second shell.

11. The ornamental device of claim 9, wherein said locking means of said first shell twists together with said locking means of said second shell.

12. The ornamental device of claim 9, wherein said electric circuit controlling means includes a means to play at least one volume level of a musical selection.

13. The ornamental device of claim 9, wherein said electric circuit controlling means includes a means to cause the rhythmic flashing of said light source.

14. The ornamental device of claim 9, wherein said electric circuit controlling means includes a means to play at least one volume level of a musical selection and to cause the rhythmic flashing of said light source in synchrony with said playing of at least one volume level of said musical selection.

* * * * *